US006944147B2

(12) United States Patent
Chheda (10) Patent No.: US 6,944,147 B2
(45) Date of Patent: Sep. 13, 2005

(54) SYSTEM AND METHOD FOR MAXIMIZING CAPACITY IN A TELECOMMUNICATIONS SYSTEM

(75) Inventor: Ashvin Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 829 days.

(21) Appl. No.: 10/014,093

(22) Filed: Dec. 10, 2001

(65) Prior Publication Data

US 2003/0231586 A1 Dec. 18, 2003

(51) Int. Cl.$^7$ ............................................... H04B 7/216
(52) U.S. Cl. ....................... 370/342; 370/328; 370/329; 370/335; 370/342; 370/441; 370/479; 455/447
(58) Field of Search ................................. 370/480, 479, 370/465, 441, 342, 230, 231, 252, 335; 455/452.1, 522

(56) References Cited

U.S. PATENT DOCUMENTS

| 5,267,261 A | 11/1993 | Blakeney, II et al. |
| 5,327,575 A | 7/1994 | Menich et al. |
| 5,428,816 A | 6/1995 | Barnett et al. |
| 5,432,843 A | 7/1995 | Bonta |
| 5,442,634 A | 8/1995 | Cizek |
| 5,577,022 A | 11/1996 | Padovani et al. |
| 5,613,205 A | 3/1997 | Dufour |
| 5,623,535 A | 4/1997 | Leung et al. |
| 5,640,414 A | 6/1997 | Blakeney, II et al. |
| 5,722,072 A | 2/1998 | Crichton et al. |
| 5,737,705 A | 4/1998 | Ruppel et al. |
| 5,740,535 A | 4/1998 | Rune |
| 5,781,543 A * | 7/1998 | Ault et al. .................. 370/342 |
| 5,828,661 A | 10/1998 | Weaver, Jr. et al. |
| 5,848,063 A | 12/1998 | Weaver, Jr. et al. |
| 5,854,981 A | 12/1998 | Wallstedt et al. |
| 5,884,176 A | 3/1999 | Vaara |
| 5,905,960 A | 5/1999 | Nicholl et al. |
| 5,917,811 A | 6/1999 | Weaver, Jr. et al. |
| 5,930,710 A | 7/1999 | Sawyer et al. |
| 5,946,621 A | 8/1999 | Chheda et al. |
| 5,978,686 A | 11/1999 | Aoshima |
| 5,995,834 A | 11/1999 | Moore |

(Continued)

FOREIGN PATENT DOCUMENTS

| EP | 0 701382 A1 | 8/1995 |
| EP | 0 889 663 A1 | 1/1999 |
| GB | 2 301 733 | 12/1996 |
| WO | WO 95/07578 A1 | 3/1995 |
| WO | WO 99/12302 A1 | 3/1999 |
| WO | WO 02/060196 A2 | 8/2002 |

OTHER PUBLICATIONS

Chheda, Ashvin; On the Forward Link Capacity of a cdma2000–1X System with Transmit Diversity, 52$^{nd}$ Vehicular Technology Conference Fall 2000, vol. 2, Sep. 24, 2000, pp. 618–623.

Primary Examiner—Seema S. Rao
Assistant Examiner—Jay Patel
(74) Attorney, Agent, or Firm—Haynes and Boone, LLP (57) ABSTRACT

Provided is a system and method for maximizing the number of communication sessions in a telecommunications network. The network includes multiple protocols that each utilize a certain number of codes and a certain amount of power. Accordingly, the desirability of each protocol may vary depending on the number of codes and the amount of power available. A code usage level and a power usage level for the network are obtained and compared to determine whether the network is using a higher percentage of the available codes or a higher percentage of the available power. If a higher percentage of codes are in use, a new session may be established using a protocol that uses relatively few codes but more power. Likewise, if a higher percentage of power is in use, the new session may be established using a protocol that uses relatively little power but more codes.

30 Claims, 8 Drawing Sheets

U.S. PATENT DOCUMENTS

| | | | |
|---|---|---|---|
| 6,044,083 A | * | 3/2000 | Citta et al. .................. 370/441 |
| 6,061,549 A | * | 5/2000 | Labonte et al. .......... 455/67.13 |
| 6,112,089 A | | 8/2000 | Satarasinghe |
| 6,181,738 B1 | * | 1/2001 | Chheda et al. .............. 375/224 |
| 6,192,246 B1 | | 2/2001 | Satarasinghe |
| 6,262,994 B1 | * | 7/2001 | Dirschedl et al. ........... 370/465 |
| 6,317,435 B1 | * | 11/2001 | Tiedemann et al. ......... 370/441 |
| 6,434,380 B1 | * | 8/2002 | Andersson et al. ......... 455/406 |
| 6,512,784 B2 | * | 1/2003 | Schilling .................... 375/141 |
| 6,829,468 B2 | * | 12/2004 | Gandhi et al. ................ 455/69 |
| 6,873,645 B2 | * | 3/2005 | Lomp et al. ................ 375/142 |
| 2004/0120290 A1 | * | 6/2004 | Makhijani et al. .......... 370/335 |
| 2004/0162081 A1 | * | 8/2004 | Lu .......................... 455/452.1 |
| 2004/0192315 A1 | * | 9/2004 | Li et al. ..................... 455/447 |

* cited by examiner

SYSTEM AND METHOD FOR MAXIMIZING CAPACITY IN A TELECOMMUNICATIONS SYSTEM

BACKGROUND OF THE INVENTION

The following disclosure relates generally to communications systems and, more particularly, to maximizing capacity in a telecommunications system.

Telecommunications systems, such as code division multiple access (CDMA) systems, may face a variety of constraints that limit the number of simultaneous user communication sessions that the system is able to serve. The constraints may include resource limitations such as a maximum number of available user identification codes (such as Walsh codes or orthogonal variable spreading factor (OVSF) codes) or a maximum amount of available power. For example, if a system only has one hundred and twenty-eight available codes per sector, then a theoretical maximum of one hundred and twenty-eight users per sector may use the system at once, assuming there is sufficient power to support the users. Some systems may use multiple codes for a single user (such as for active users moving from one sector to another, e.g., soft handoff) and so even fewer users may be able to access the system simultaneously. Likewise, a maximum power output level per sector may be defined for a system, and so users requesting a new communication session that would exceed the power output level may be "blocked" (e.g., not allowed access to the system).

A telecommunications system may use one of a number of different protocols or radio configurations to establish a communication session and each protocol may provide certain benefits and have certain resource needs. For example, a system may utilize one of several different protocols to establish and carry a voice communication session depending on information carried in the request for the session. One of the protocols may be generally limited by the number of available codes while another protocol may be generally limited by the amount of available power. However, due to the underlying network structure and other factors, a protocol may be selected for the communication session without regard to the system's resource levels.

Therefore, what is needed is a system and method for maximizing the number of communication sessions in a telecommunications system by selecting a protocol based on the current level of system resources.

SUMMARY OF THE INVENTION

In one embodiment, a method for maximizing a number of communication sessions in a telecommunications system is provided. The telecommunications system is constrained by a maximum number of user codes and a maximum amount of power, and utilizes a protocol to establish a communication session. The protocol is selected from multiple protocols, and may be a first protocol that is more efficient in power use than code use or a second protocol that is more efficient in code use than power use.

The method obtains two metrics from the telecommunications system. The first metric is associated with a percentage of the maximum number of user codes being used by the telecommunications system and the second metric is associated with a percentage of the maximum amount of power being used by the telecommunications system. The two metrics are compared to identify which of the two metrics is greater. The second protocol is then selected to establish the new communication session if the first metric is greater and the first protocol is selected to establish the new communication session if the second metric is greater. Selecting a protocol using this method enables the telecommunications system to utilize its codes and power more efficiently, and to maximize the number of communication sessions that may be simultaneously handled.

Other aspects and features of the present invention will become apparent to those ordinarily skilled in the art upon review of the following description of specific embodiments of the invention in conjunction with the accompanying figures.

DETAILED DESCRIPTION OF A PREFERRED EMBODIMENT

The present disclosure relates generally to communications systems and, more particularly, to maximizing capacity in a telecommunications system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
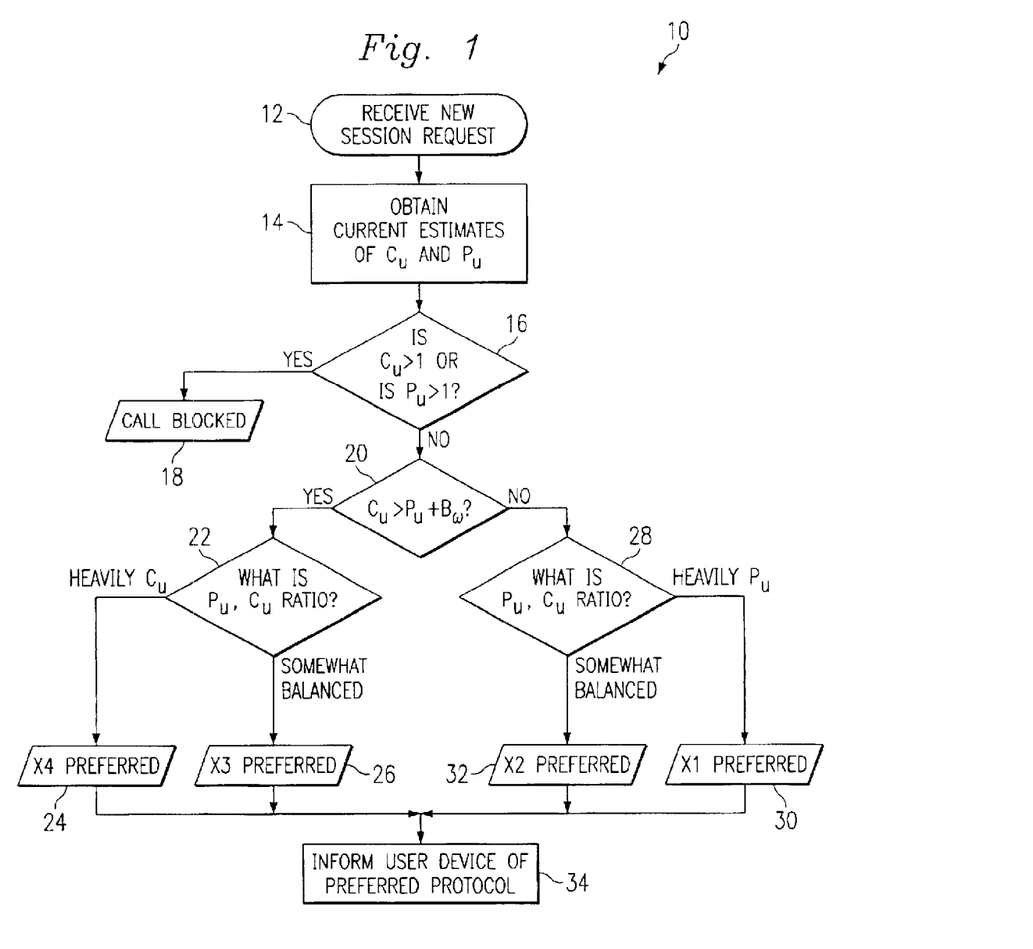
FIG. 1 is a flowchart of a method for selecting one of a plurality of protocols based on a telecommunications system's resource usage levels.

Referring now to FIG. 1, in one embodiment, a method 10 is operable to select one of a number of protocols using steps 12–34 to establish a communication session in a telecommunications system. As will be described later in greater detail using specific examples, the selection of the protocol may be based on a user code usage level and power usage level. The system may have a limited number of user codes and a limited amount of power, and when either resource reaches a predetermined level of use, new users may be "blocked" and not permitted to utilize the system until the resources become available. The blocking generally occurs when either resource reaches a predefined blocking threshold usually representing a maximum available level of a resource. As is illustrated in FIG. 2, the code usage level and the power usage level may be divided into a number of "zones," with each zone represented by a protocol.

Figure 2:
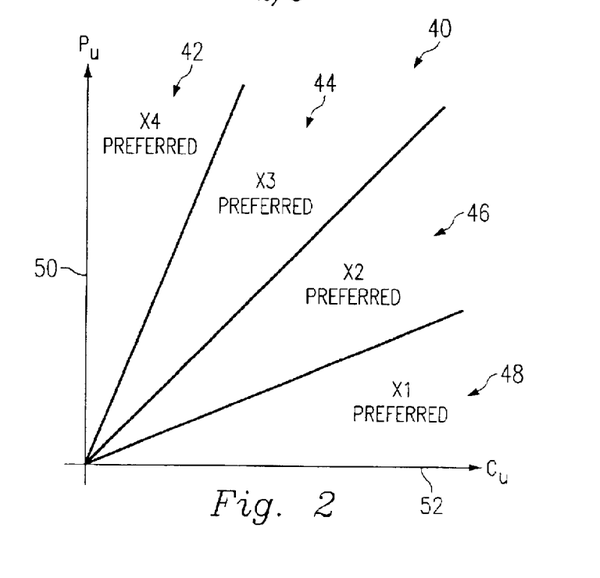
FIG. 2 is a graph illustrating the application of the protocols utilized by the method of FIG. 1 to multiple zones representing different ratios of code usage and power usage.

Referring now to FIG. 2, a graph 40 illustrates four zones 42, 44, 46, and 48 referenced against a level of power usage ($P_u$) 50 and a level of code usage ($C_u$) 52. Each zone 42–48 represents a different distribution of power usage and code usage in a telecommunications system. For example, zone 42 represents the system when there is a high level of power usage but a relatively low level of code usage, while zone 48 represents the system when there is a low level of power usage but a relatively high level of code usage.

In the present example, the system may utilize one of four protocols X1, X2, X3, and X4 to establish and maintain a communication session. As will be described later in greater detail, each of the protocols may provide certain advantages and disadvantages in terms of system resources, including their usage of user codes and system power. For example, as illustrated in Table 1, the protocol X1 is very efficient in terms of code use (e.g., uses a relatively small number of the available codes), but very inefficient in terms of power use. In contrast, the protocol X4 is very efficient in terms of power use, but very inefficient in terms of code use. The protocols X2 and X3 fall between the protocols X1 and X4 in terms of code and power usage, with X2 being somewhat efficient in code use and somewhat inefficient in power use, and X3 being somewhat inefficient in code use and somewhat efficient in power use.

TABLE 1

|    | Code Use ($C_u$) | Power Use ($P_u$) |
| --- | --- | --- |
| X1 | Very Efficient | Very Inefficient |
| X2 | Efficient | Inefficient |
| X3 | Inefficient | Efficient |
| X4 | Very Inefficient | Very Efficient |

When a user of a communication device requests that the system establish the communication session, the request may include that the session be established with a particular one of the specific protocols X1, X2, X3, or X4. Accordingly, when the system receives the request for one of the specific protocols X1–X4, the system may attempt to establish the communication session using the requested protocol, regardless of the level of availability of resources. For example, if the request was for X1, the system would attempt to establish the session using X1, even if the system had a high level of power usage but had a relatively low level of code usage.

In contrast, the capacity of the system may be maximized by determining which of the protocols X1–X4 would be the most efficient depending on the system's current level of code usage and power usage, and then telling the user's device to use that protocol. As illustrated in FIG. 2, the preferred protocol (e.g., the one selected as the most efficient for a given ratio of code and power usage) varies depending on the current resource allocation of the system. Continuing the above example where the system has a high level of power usage but has a relatively low level of code usage (zone 42), the system may inform the user's device that the protocol X4 is to be used, which will minimize power use. Because the level of power usage is greater than the level of code usage, selecting the protocol that uses less power but more codes will prevent the system from reaching the call blocking threshold as quickly. However, if the code and power usage levels are somewhat balanced, but the code level is still high relative to the power usage level (e.g., zone 46), the system may select X2 as the preferred protocol. X2 is somewhat code efficient and will serve to balance the system resources. It is noted that the regions illustrated in FIG. 2 may be specified by a number of different methods. For example, the selection may be based on offline statistical Monte-Carlo type simulations that would implement a cost function to ensure that capacity is maximized by determining the optimal region area for each protocol.

Referring again to FIG. 1, the method 10 may be used to select the protocol X1–X4 referenced in FIG. 2 that is most advantageous to the system. This allows the system to balance its resource usage and maximize the number of simultaneous communication sessions, which it is able to handle. In step 12, a request is received to establish a new communication session by a communication unit such as a mobile device. Current estimates of the code usage level and the power usage level are obtained in step 14. This estimate may be obtained by a base transceiver station (BTS) or similar device involved in communication with a terminal. The BTS is a system entity or radio that is associated with the cell or sector site that a mobile device is currently within.

In the present example, the code usage level may be computed by determining the number of codes currently in use by the BTS in that sector as a fraction of the number of codes specified as the code-blocking threshold. Since the codes may be of different lengths, depending on the protocols in use, the protocol using the highest number of codes is used as the normalizing protocol. For instance, assume X1 uses codes of length 256, X2 uses codes of length 192, X3 uses codes of length 128, and X4 uses codes of length 64. To normalize the codes, every X4 code in use is viewed as using 4 codes from a pool of 256 codes, every X3 code in use is viewed as using 2 codes from the pool of 256 codes, every X2 code in use is viewed as using 1.33 codes from the pool of 256 codes, and every X1 code in use is viewed as using 1 code from the pool of 256 codes.

In the present example, the power usage level may be computed by determining the power currently in use by the BTS in that sector as a fraction of the power specified as the power-blocking threshold. For example, the BTS may use a filter to compute the power currently in use, which smoothes out short-term power spikes. That is, the power determination unit computes the average power over a short period of time, rather than using instantaneous power.

In step 16, a determination is made as to whether either the code usage level or the power usage level exceeds unity, which implies that the code and/or power blocking thresholds have been exceeded, respectively. If either the code usage level or power usage level exceeds unity, the communication session is blocked in step 18 and the method ends. If neither usage level exceeds its blocking threshold, then a determination is made in step 20 as to which protocol should be selected for the communication session. In the present example, this determination compares the code usage level to the power usage level. If the code usage level is greater than the power usage level, either X3 or X4 should be selected and the method continues to step 22, where a determination is made as to whether X3 or X4 should be used. This determination may be based on a ratio between the code and power usage levels (as shown in step 20 and may also include a bias weight assignment), a second comparison similar to that of step 20, or other desired criteria. The determination made in step 22 results in one of the protocols X4 or X3 being selected in steps 24, 26, respectively, before the system informs the communication device in step 34 of the preferred protocol. Typically, the BTS may inform another device such as a base station controller (BSC) of the selection, and the BSC may update the messaging between a network and the mobile device to reflect the protocol usage requirements. However, the actual execution of the update may depend on the architecture scheme of the infrastructure.

If the power usage level exceeds the code usage level, either X1 or X2 should be selected and the method proceeds from step 20 to step 28, where a determination is made as to whether X1 or X2 should be used. This determination may be based on a ratio between the code and power usage levels (as shown in step 20 and may also include a bias weight assignment), a second comparison similar to that of step 20, or other desired criteria. The determination made in step 28 results in one of the protocols X1 or X2 being selected in steps 30, 32, respectively, before the system informs the communication device in step 34 of the preferred protocol. It is noted that step 20 may be used to select the preferred protocol by including a measure of the difference between Cu and Pu and associated thresholds to point to X1–X4, negating the need for steps 22 and 28. In this manner, the communication session may be established using the protocol that balances usage of the system resources.

Figure 3:
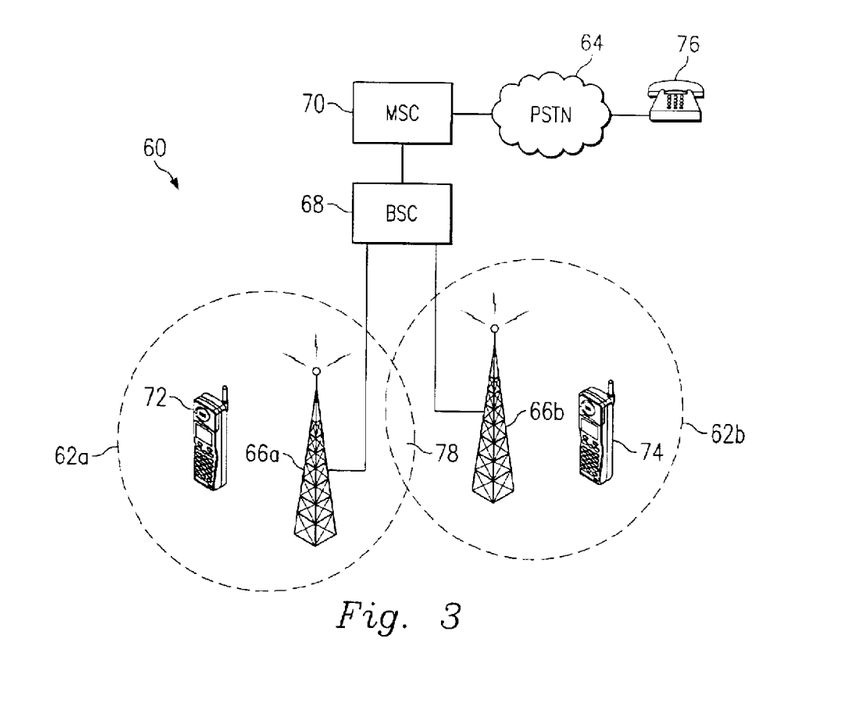
FIG. 3 is a diagram of an exemplary telecommunications network within which the selection of a preferred protocol may be practiced.

Referring now to FIG. 3, in another embodiment, a telecommunications network 60 illustrates a system in which the method described in reference to FIGS. 1 and 2 may be practiced. The network 60 comprises a plurality of cells 62a, 62b, which, for purposes of clarity, are omni-cells (e.g., not sectorized). In general, a cell may contain more than one sector if the cell is not an omni-cell. For instance, a tri-sectored cell contains three sectors. The terms "cell" and "sector" are used interchangeably in the present disclosure. In the present example, the network 60 is a wireless network, and may be connected to other wireless and/or wireline networks, such as a Public Switched Telephone Network (PSTN) 64. Each cell 62a, 62b in the network 60 includes a base transceiver station (BTS) 66a, 66b, respectively, which is connected to a base station controller (BSC) 68. A mobile switching center (MSC) 70 may be used to connect the network 60 with other networks such as the PSTN 64.

The network 60 enables at least one mobile device 72 to establish a communication session with another communication device 74 via the BTS 66a associated with the cell 62a in which the mobile device 72 is located. For example, a request to establish a voice communication session by the mobile device 72 may be directed by the MSC 70 to (1) the second mobile device 74 registered with the MSC 70 and within range of one of the BTSs 66a, 66b, (2) a voice terminal 76 coupled to the PSTN 64, or (3) a voice terminal (not shown) coupled elsewhere to the telecommunications network 60. If the communication session is a data transfer session, the request may be to connect the mobile device 72 to a computer or other data device via the network 60.

The cells 62a, 62b overlap so that the mobile device 72 may travel from one cell to another (e.g., from the cell 62a to the cell 62b) while maintaining a communication session. In a "handoff" region 78 (e.g., the area where the cells 62a, 62b overlap), the mobile device 72 may be serviced by both the ETS 66a and the BTS 66b.

In the present example, the network 60 is a code division multiple access (CDMA) based network, which may be compatible with a variety of standards including, but not limited to, Interim Standard 95 (IS-95), Interim Standard 2000 (IS-2000), and Universal Mobile Telecommunications System (UMTS). Each standard may be further divided into a plurality of different protocols. For example, IS95 may include Radio Configuration 1 (RC1) and RC2 (also known as Rate Set 1 (RS1) and Rate Set 2 (RS2)), while IS2000 may be backwards compatible with RC1 and RC2 and also include RC3, RC4, and RC5. Other known differences may exist between the standards. For example, IS2000 may include faster power control (e.g., between the BTS 66a and the mobile device 72) and more bandwidth efficient modulation than some other standards. For purposes of clarity, the following discussion assumes that the network 60 utilizes the RC3 and RC4 protocols to establish a voice call, although it is understood that many different protocols and standards may be utilized to establish a variety of communication session types.

Each BTS 66a, 66b may be constrained by at least two factors which limit the number of simultaneous communication sessions. As described with respect to FIGS. 1 and 2, the limiting factors may include the number of codes available and the amount of power available. If no codes are available or not enough power is available, new users will be "blocked" (e.g., not granted access). For example, a new user for whom there is no available code may receive a message saying the network is busy.

The first limiting factor (e.g., the number of available codes) will be described in the context of the CDMA network 60 using the RC3 and RC4 protocols. Both RC3 and RC4 generally transmit voice communications at a rate of 9600 bits per second (bps), although data may be transmitted at higher rates such as 19.2 bps or 38.4 bps. As is known in the art, CDMA identifies each user within a sector by a unique code such as a Walsh code. However, due to differences in the protocols, RC3 may provide a different number of user codes than RC4. For example, RC3 uses 1 convolutional coding (e.g., each bit going into an encoder is converted into four output coded bits). Due to the ¼ convolutional coding, the base transmission rate for speech of 9600 bps becomes 38.4 kilobits per second (kbs). This 38.4 kbs stream is effectively divided into an I and a Q branch of 19.2 kbs each, which is spread at approximately 1.2288 megachips per second (mcps). Therefore, the RC3 Walsh code length may be calculated as 1.2288 mcps/19.2 kbs=64 chips. Accordingly, due to the orthogonal nature of Walsh codes, RC3 has a maximum number of 64 Walsh codes per sector.

In contrast, RC4 uses ½ convolutional coding (e.g., each bit going into the encoder is turned into two output coded bits). Due to the ½ convolutional coding, the base transmission rate for speech of 9600 bps becomes 19.2 kbs. This 19.2 kbs stream is effectively divided into an I and a Q branch of 9.6 kbs each, which is spread at approximately 1.2288 mcps. Therefore, the RC4 Walsh code length may be calculated as 1.2288 mcps/9.6 kbs=128 chips. Accordingly, due to the orthogonal nature of Walsh codes, RC4 has a maximum number of 128 Walsh codes.

The maximum number of codes available in a protocol such as RC3 or RC4 generally does not translate to the number of users supportable per sector. There are two primary reasons for this. The first reason is that the number of users in a sector may not be limited by the number of codes available, but rather by the amount of power available. The second reason is that users may be in "handoff" with multiple sectors, which implies that multiple codes in the system are being utilized by a single user, some fractions of the time. A handoff occurs when a user travels from one sector to another (e.g., from the cell 62a to the cell 62b). In order to continue the call without interruption, the network 60 must enable the origination cell 62a (which the user is exiting) to handoff or transfer the communication session to the destination cell 62b (which the user is entering). Accordingly, for a duration of time both cells, 62a and 62b, may be communicating with the mobile device 72. If codes are not available for handoff, the mobile device 72 will be dropped as it propagates further into cell 62b if the BTS 66b has no available codes.

The effective number of available codes, which translates to the effective number of unique users that can be supported in a sector based on codes, is approximately equal to the total number of codes (64 for RC3, 128 for RC4) divided by the effective handoff factor. The effective handoff factor is the average number of sectors that a user may use. For purposes of example, this may be approximately 1.7–1.9 sectors per user in the network 60. Using this handoff factor, RC3 may be limited to about 64/1.7≈37 users per sector, while RC4 may have approximately 128/1.7≈76 users per sector. It is noted that the system may be unable to actually serve this many users per sector as the system may be blocking on power with a number of users that are much less than 37 or 76, for RC3 or RC4, respectively. In addition, some of the codes in each sector may be allocated to common channels such as Pilot channels, Paging channels, Synch Channels, etc. Accordingly, a sector using RC3 and servicing a given number of users will typically use up its available codes before a similar sector using RC4.

To calculate a code usage level, the codes may be normalized so that both RC3 and RC4 use the same number codes for purposes of calculating the usage level. For example, the 64 RC3 codes and the 128 RC4 codes may be normalized by assuming that each RC4 user takes up one code and each RC3 user takes up two codes. Accordingly, the code usage level ($C_u$) may be calculated as:

$$C_u = \text{number of codes used/code blocking threshold} \quad (1)$$

where the codes are normalized. For example, assuming that 120 codes are available per sector (e.g., there is a blocking threshold of 120 codes) and 60 codes are being used in a sector, the $C_u$ computed by that sector's BTS would be 60/120=50 percent. Therefore, 50 percent of the available codes are in use by the BTS performing the calculation. It is noted that while the present example defines the code usage level by equation (1), the code usage level may also be defined in numerous other ways. For example, a metric that is indirectly associated with the code usage level may be utilized in place of the calculation of equation (1).

The second factor limiting the number of simultaneous users which may be serviced by the cell 62a is the amount of power available to the BTS 66a. The BTS 66a has a power amplifier (PA) with a power rating identifying the maximum safe amount of power available from the PA. If the PA is driven past a certain threshold, it may suffer damage or failure.

Generally, the power blocking threshold is set below the rating of the PA for a number of reasons. First, since active users may not use a constant level of power, but a varying level of power depending on the channel conditions (power control), a margin must be added to account for per user variability in power. Second, some power may be budgeted for new users that are arriving from other sectors (e.g. handoff). In this case, the user is not a new originating call, but rather an on-going call that is transitioning through the sector. An active call is generally not blocked, as from a subscriber's perspective this is a dropped call, which is a quality issue. Accordingly, if the users are requiring more power than is available, the current users may go into power limitation with associated call quality degradation and new users may be blocked. If the communication session is a data session, the network 60 may queue the data rather than block the session entirely. Partially because of the larger number of available codes using the RC4 protocol, a sector solely using RC4 may face power limitations more frequently than code limitations (e.g., the sector may reach the power blocking threshold more frequently than the code blocking threshold).

Under general communication principles, the protocols may be designed such that there is a trade-off between bandwidth efficiency and power efficiency. Accordingly, schemes that improve one may typically degrade the other. For example, using coding at reduced rates will increase the power efficiency but reduce the bandwidth efficiency. Also, changing the modulation schemes (e.g., from quadrature phase shift keying (QPSK) to 8-ary phase shift keying (8-PSK), or high order quadrature amplitude modulation (16-QAM or 64-QAM) may increase the bandwidth efficiency but reduce the power efficiency.

To calculate a power usage level, the power in use is divided by the available power, which is the power blocking threshold. Accordingly, the power usage level ($P_u$) may be calculated as:

$$P_u = \text{amount of power used/power blocking threshold} \quad (2)$$

For example, assume that the BTS 66a has a PA capable of generating 1 kilowatt (kw) of output power and the power blocking threshold is set at 80 percent. Therefore, the BTS 66a will block when the amount of output power being used reaches 0.8 kw. Accordingly, if the BTS 66a is providing services which are utilizing 0.4 kw of output power, then the $P_u$ would be 0.4 kw/0.8 kw=50 percent. In general, the instantaneous power used may not be the value used in equation (2). A filtering procedure with a relatively short time constant may be used to average the output power over time, such that the amount of power used in equation (2) is a filtered value that averages out the very short time power spikes that may occur in CDMA. It is noted that while the present example defines the power usage level by equation (2), the power usage level may also be defined in numerous other ways. For example, a metric that is indirectly associated with the power usage level may be utilized in place of the calculation of equation (2).

Figure 4:
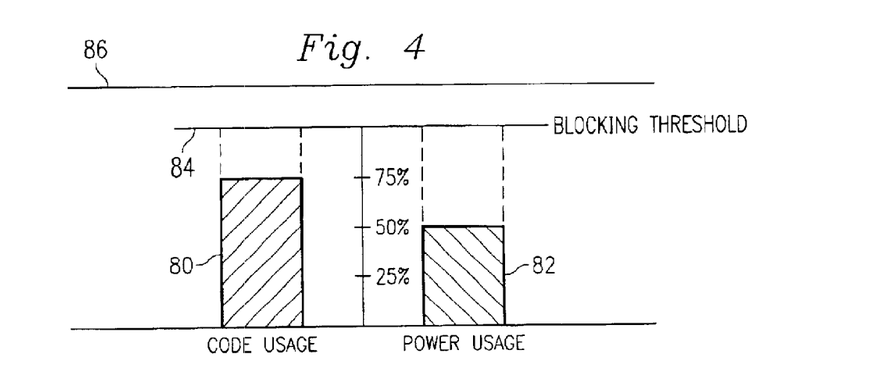
FIG. 4 is a bar graph illustrating a level of code usage and a level of power usage relative to a blocking threshold.

Referring now to FIG. 4, a code usage level 80 and a power usage level 82 are illustrated relative to a blocking threshold 84. The code usage level 80 and the power usage level 82 may be calculated as described in reference to FIG. 3. The blocking threshold 84 may be set at a predetermined level, which is lower than an actual maximum resource level 86. It is noted that each of the code and power usage levels may have a separate blocking threshold. In the present example, the code usage level 80 and power usage level 82 are normalized so that they reach the blocking threshold 84 when their applicable resources are at the maximum allowed level. For example, if the sector has a maximum of one hundred and twenty codes available for users per sector and has the maximum available power set at 80% of the PA, each value is normalized so that the threshold represents the maximum available code and power usage. As shown, approximately 75% of the available codes are in use, while only approximately 50% of the available power is in use. A blocking algorithm may be utilized to monitor the code and power usage levels and to determine whether to block a new user due to insufficient resources.

Figure 5:
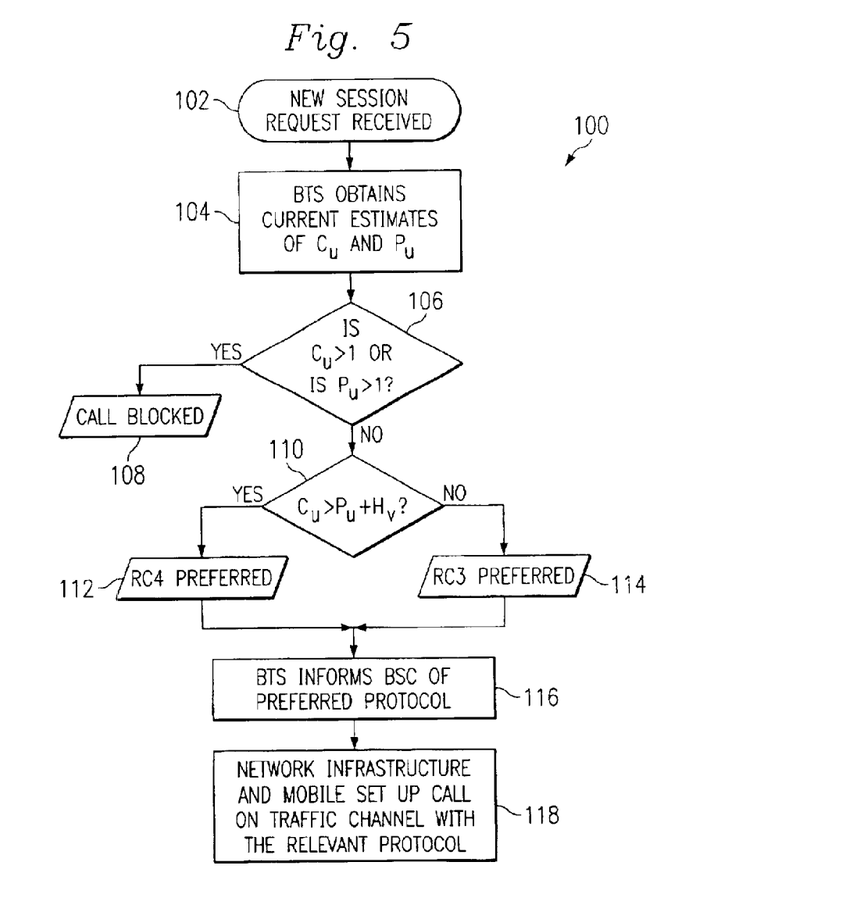
FIG. 5 is a flowchart illustrating the method of FIG. 1 applied to specific protocols.

Referring now to FIG. 5, in one embodiment, a method 100 is operable to select either the RC3 or the RC4 protocol, using steps 102–118 to establish a communication session in the cell 62a of the telecommunications network 60 of FIG. 3 based on a current user code usage level and power usage level. As described previously, the BTS 66a of the cell 62a may have a limited number of Walsh codes and a limited amount of power, and when either resource reaches a predetermined level, new users may be "blocked" and not permitted to utilize the cell 62a until the resources are available. As is illustrated in FIG. 6, the code usage level and the power usage level may be divided into a number of "zones" represented by a protocol.

Figure 6:
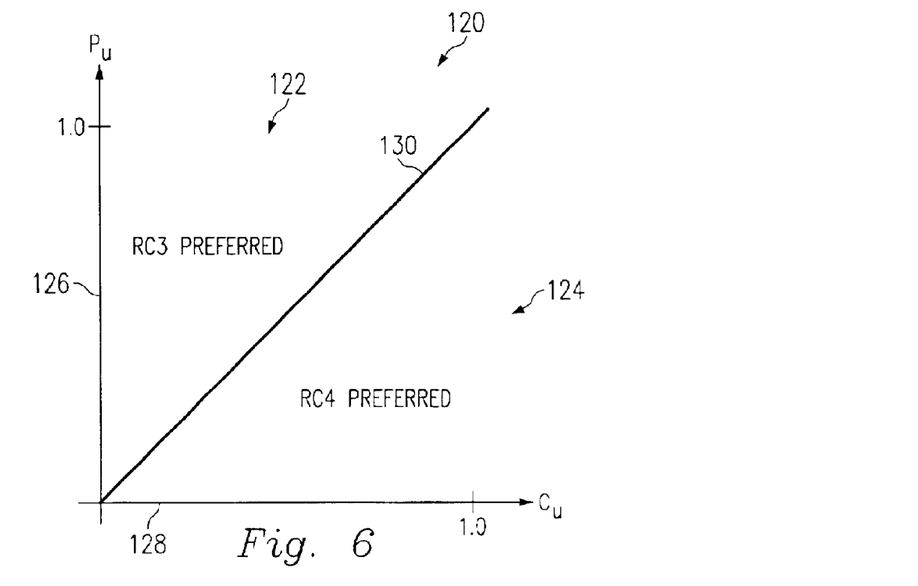
FIG. 6 is a graph illustrating the application of the specific protocols utilized by the method of FIG. 5 to multiple zones representing different ratios of code usage and power usage.

Referring now to FIG. 6, a graph 120 illustrates two zones 122 and 124 referenced against a level of power usage ($P_u$) 126 and a level of code usage ($C_u$) 128, both of which may be normalized. Each zone 122, 124 represents a different distribution of power usage and code usage in the BTS 66a. For example, zone 122 represents the BTS 66a when there is a higher level of power usage than code usage, while zone 124 represents the BTS 66a when there is a lower level of power usage than code usage. A boundary line 130 (e.g., a protocol threshold) divides the zones 122 and 124. As will be described later, the boundary line 130 may be adjusted to a different slope by a gradient factor, which may be used to selectively bias the selection criteria between power usage and code usage ratios of the zones 122 and 124.

In the present example, the BTS 66a may utilize either the RC3 or the RC4 protocol to establish and maintain the communication session. As described previously, each of the protocols may provide certain advantages and disadvantages in terms of system resources, including their usage of user codes and system power. For example, as illustrated in Table 2, the protocol RC4 is more efficient in terms of code usage (e.g., uses a relatively small number of the available codes due to its pool of 128 codes compared to the pool of 64 codes available to RC3) than in power usage. In contrast, the protocol RC3 is more efficient in terms of power usage than in code usage.

TABLE 2

| | Code Use ($C_u$) | Power Use ($P_u$) |
|---|---|---|
| RC4 | Efficient | Inefficient |
| RC3 | Inefficient | Efficient |

When the mobile device 72 of FIG. 3 requests that the BTS 66a establish a communication session, the current utilization of codes and power may be reviewed to determine whether the BTS 66a is currently operating in zone 122 or 124. If the BTS 66a has a high level of power usage but has a relatively low level of code usage (zone 122), the network 60 would inform the user's device 72 to use the protocol RC3, which will minimize power usage. Because the level of power usage is greater than the level of code usage, selecting the protocol that uses less power will prevent the system from reaching the blocking threshold as quickly. Likewise, if the BTS 66a has a high level of code usage but has a relatively low level of power usage (zone 124), the network 60 would inform the user's device 72 to use the protocol RC4, which will minimize code usage. Because the level of power usage is less than the level of code usage, selecting the protocol that uses fewer codes will prevent the system from reaching the blocking threshold as quickly.

Referring again to FIG. 5, the method 100 may be used to select the protocol RC3 or RC4 referenced in FIG. 6 that is most advantageous to the BTS 66a. This enables the BTS 66a to balance its resource usage and maximize the number of simultaneous communication sessions that it is able to handle. In step 102, a request is received to establish a new voice call in cell 62a. The BTS 66a obtains current estimates of the power usage level and the code usage level in step 104. In step 106, a determination is made as to whether either the code usage or the power usage exceeds the code and power blocking thresholds, respectively. If either the code usage or power usage exceeds its respective blocking threshold, the call is blocked in step 108 and the method ends.

If neither usage exceeds its blocking threshold, then a determination is made in step 110 as to which protocol should be selected for the call. In the present example, this determination involves a comparison as to whether the code usage exceeds the power usage:

$$C_u > P_u U + H_v \qquad (3)$$

Similar to the calculation used in reference to FIG. 1, the present calculation includes a "skewing factor" denoted $H_v$ (and illustrated in FIG. 6 as the boundary line 130) for a voice call skewing factor. A different skewing factor $H_D$ may be used for data sessions. The skewing factor $H_v$, which may be zero, enables corrections to be made in the comparison. For example, due to irregularities in the shape, user concentration, or other attributes of the cell 62a, the BTS 66a may consistently run out of one resource before the other. For example, the BTS 66a may consistently reach the blocking threshold on code usage while rarely blocking on power. The skewing factor $H_v$ may be used to account for this imbalance by taking the irregularities of the cell 62a into account and biasing the calculation with respect to power usage.

If the code usage level is greater then the power usage level, RC4 is selected in step 112 and the BTS 66a informs the BSC 68 that RC4 is the preferred protocol in step 116. If the power usage level exceeds the code usage level, RC3 is selected in step 114 and the BTS 66a informs the BSC 68 that RC3 is the preferred protocol in step 116. In step 118, the network 60 notifies the mobile device 72 of the configuration to use, and the call is set up to transmit traffic on the forward link using the configuration. This set up procedure may involve standardized messages between the network 60 and the mobile device 72, and standardized or non-standardized messages between the BSC 68 and the BTS 66a.

Figure 7:
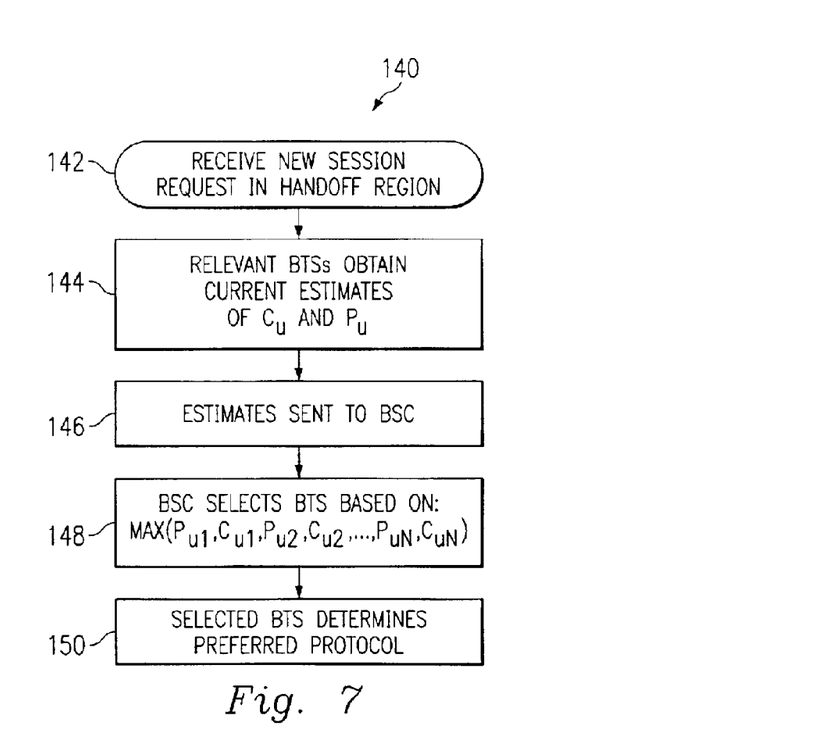
FIG. 7 is a flowchart of a method for determining which component of the network of FIG. 3 will select the preferred protocol during soft handoff.

Referring now to FIG. 7, in yet another embodiment, a method 140 illustrates determining a preferred protocol when a communication session is initiated in the handoff region 78. In the present example, any one of the BTSs 66a, 66b may be able to select a preferred protocol. However, unless the code usage level and power usage level of each BTS 66a, 66b is considered, the BTS selecting the preferred protocol may select a protocol that is disadvantageous to the other BTS. Then, if the user moves from the handoff region 78 into the cell 62a, 62b serviced by the disadvantaged BTS, the BTS resources will not have been optimally utilized. Accordingly, the method 140 enables the BTS closest to the blocking threshold to select the preferred protocol.

In an alternative embodiment, the reference BTS may be the BTS that is used to decide the protocol. The reference BTS is defined as the BTS associated with the earliest arriving usable multipath at the mobile device 72. This is usually the BTS associated with the closest cell site to the mobile device 72. Typically, the mobile device 72 informs the network 60 as to which is the reference BTS. The reference is generally used for all timing requirements by the mobile device 72. This method minimizes the messaging between the BTSs 66a, 66b and the BSC 68, but may not be optimal in some situations.

In step 142, a number of BTSs (such as the BTSs 66a, 66b) receive a new call request in a handoff region. Each BTS obtains the current estimates of its code usage level and power usage level in step 144 and sends the estimates to the associated BSC in step 146. In step 148, the BSC selects the BTS which is to choose the preferred protocol based on the general calculation:

$$\text{Max}(P_{u1}, C_{u1}, P_{u2}, C_{u2}, \ldots P_{uN}, C_{uN}) \qquad (4)$$

where $P_u$=power used/power blocking limit, $C_u$=codes used/code blocking limit (with normalized codes), and N=total number of BTSs that may establish the communication session. This calculation identifies the maximum code usage level or power usage level from the estimates received in step 146. This enables the BSC to select the BTS closest to the blocking threshold of either the code usage level or the power usage level. The BSC then notifies the selected BTS that it is to determine the preferred protocol. In step 150, the BTS may determine the preferred protocol as previously described in reference to FIGS. 1–5. In an alternative embodiment, the BSC may choose the protocol based on the estimates received in step 146 and notify the selected BTSs in handoff of the preferred protocol to use with the mobile device 72.

Figure 8:
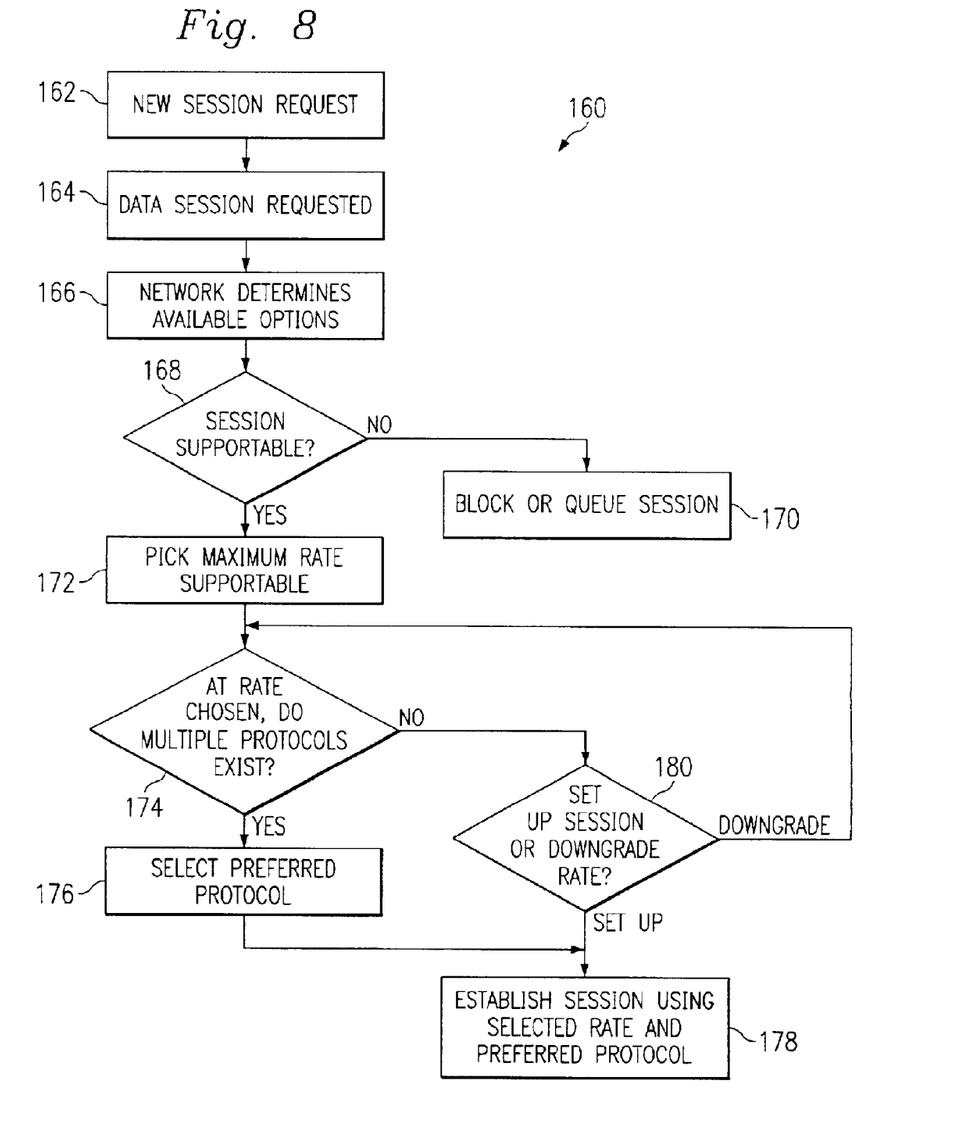
FIG. 8 is a flowchart of a method for selecting a preferred protocol in the network of FIG. 3 for a data communication.

Referring now to FIG. 8, in still another embodiment, a method 160 uses the BTS 66a, 66b and/or the BSC 68 in ways known in the art to determine a variety of network parameters. This may occur prior to the selection of a preferred protocol as described previously. In step 162, a request for a new session is received. In the present example, the request is analyzed in step 164 and determined to be a request for a data session of 38.4 kbs. In step 168, the BTSs 66a, 66b and/or BSC 68 determines what rates are available and what options may be available. Exemplary options may include different levels of code and power usage in a CDMA network utilizing RC3 and RC4, a spreading factor and coding rate types in a CDMA network using UMTS, the billing profile of the user, or other factors (such as the use of Turbo coding rather than Convolutional coding, power control options, etc.) which may influence the establishment of the session.

If a decision is made in step 168 based on the results of step 166 that no data transfer session can be supported at any rate, the session is either blocked or queued in step 170. If a data transfer session is supportable, the maximum transfer rate (generally up to the requested rate of, in this example, 38.4 kbs) is selected in step 172. In step 174, a determination is made as to whether there are multiple protocols available at the selected transfer rate. If multiple protocols are available, a preferred protocol is selected from the available protocols in step 176 as described previously in reference to FIGS. 1–7. The selection of the preferred protocol may utilize a skewing factor $H_d$ if desired. The session is then established in step 178 at the selected transfer rate using the preferred protocol.

If step 174 determines that there are not multiple protocols available to support the maximum transfer rate, then a determination is made in step 180 as to whether the session should be established using the available protocol or whether the transfer rate should be downgraded. If the sessions is to be established using the available protocol, the method continues to step 178 and the session is established. If the decision is made to downgrade the transfer rate, the method selects the next lowest transfer rate available (for example, 19.2 kbs) and returns to step 174.

In an alternative embodiment, the method 160 of FIG. 8 may be altered so that the selection of a transfer rate is based on the prior selection of a preferred protocol. In still another alternative embodiment, the selection of a preferred protocol may be combined with the selection of a transfer rate.

Figure 9A:
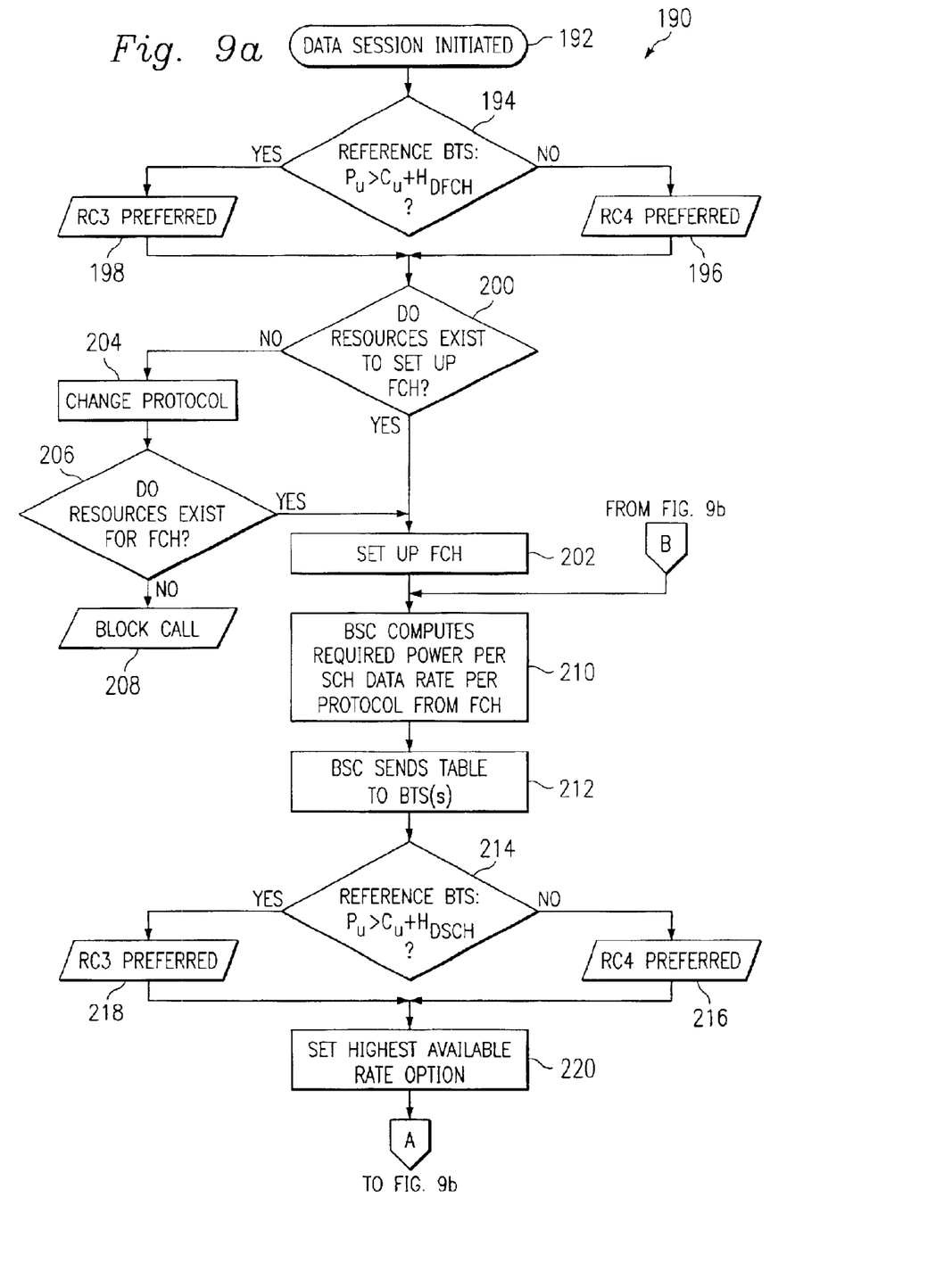
FIGS. 9a, 9b are a flowchart of a method for selecting a preferred protocol in the network of FIG. 3 for a data communication in combination with the establishment of multiple communication channels.
Figure 9B:
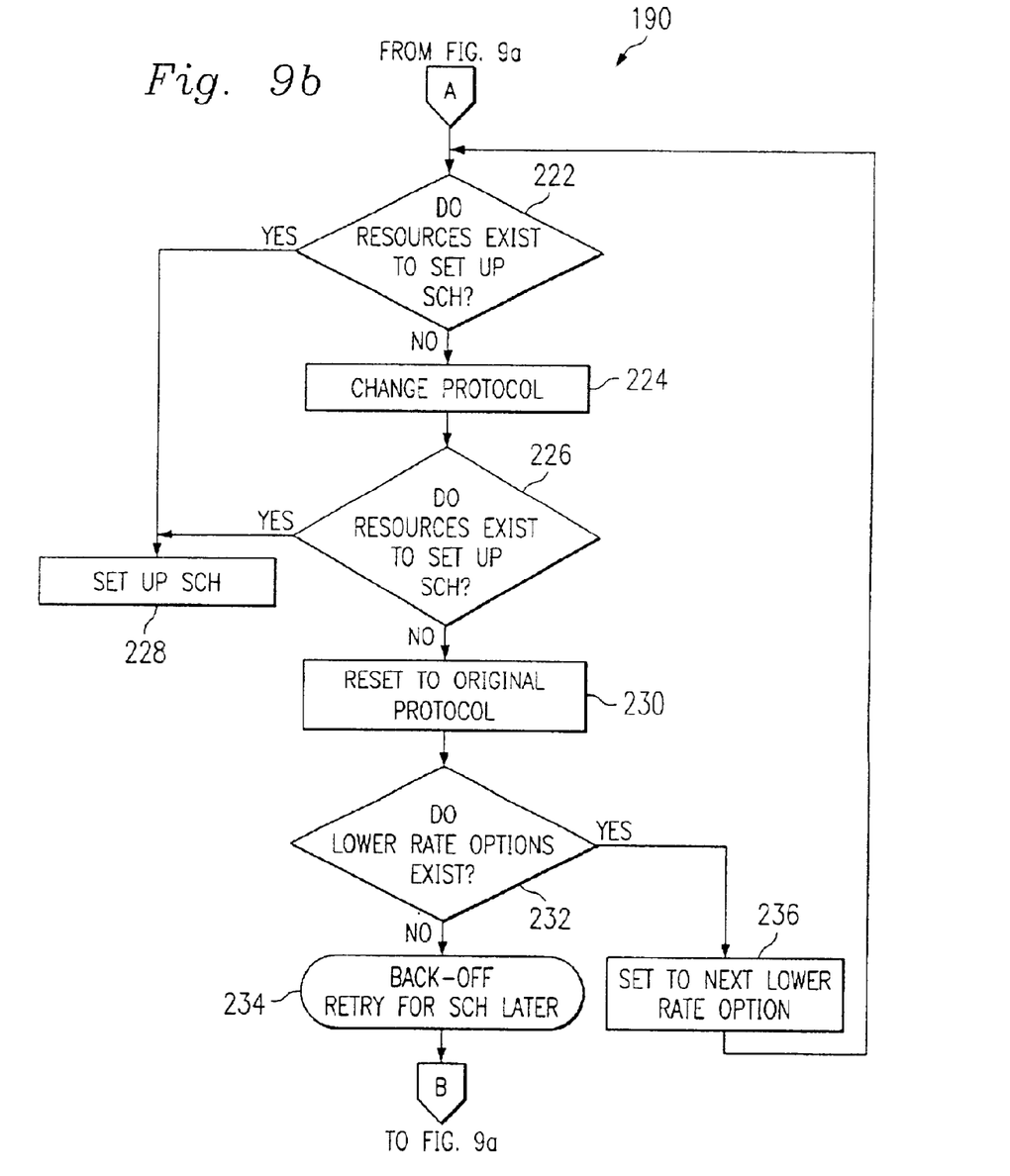

Referring now to FIGS. 9a and 9b, in still another embodiment, a method 190 may be implemented in the network 60 of FIG. 3. Although similar to the method 160 described in reference to FIG. 8, the method 190 illustrates the selection of a preferred protocol in combination with the establishment of a Fundamental channel (FCH) and a Supplemental channel (SCH). The FCH may be a low rate channel used mainly for signaling and low rate data transfer, while the SCH may be used for high rate data transfer. These two channels are generally associated with IS2000 technology, but similar channel set ups may exist in other technologies.

Referring specifically to FIG. 9a, in step 192, a new communication session request for a data transfer is received by a reference BTS (the BTS 66a of the cell 62a) from the mobile device 72. In step 194, the BTS 66a obtains a code usage level and a power usage level to determine whether to select RC3 or RC4 as the preferred protocol. In the present example, the skewing factor $H_v$ of equation (3) may be denoted $H_{DFCH}$. $H_{DFCH}$ may be chosen to bias the selection of the preferred protocol specifically with respect to the FCH. The determination that occurs in step 194 has been previously described and will not be repeated in the present example. Following the selection of the preferred protocol in either step 196 or 198 (as determined in step 194), the BTS 66a determines in step 200 whether sufficient resources (such as codes and power) exist to establish the FCH. If the resources do exist, the BTS 66a and the BSC 68 establish the FCH in step 202. If the resources do not exist, the BTS 66a may alter the protocol selection in step 204 (e.g., if RC3 was selected in step 194, then the BTS 66a may select RC4 in step 204). In step 206, the BTS 66a may determine whether sufficient resources exist to establish the FCH using the protocol selected in step 204. If the resources do not exist, the session may be blocked in step 208. If the resources do exist, the FCH is established by the BTS 66a and the BSC 68 in step 202. It is noted that there may be a plurality of protocols (other than RC3 and RC4 in the present example) and steps 204 and 206 may be repeated to determine whether resources exist for any number of the protocols. Also, it should be noted that if the session is initiated in a handoff region, the discussion referenced with respect to FIG. 7 may be applicable.

In step 210, the BTS 66a sends power information to the BSC 68 about the FCH and the BSC 68 uses the power information to calculate possible power requirements for setting up the SCH for a variety of data rates and protocols. Accordingly, a table or similar data compilation is created by the BSC 68 that lists the power requirements for a particular rate and protocol based on the current FCH in use. For example, a rate of 19.2 kbs using RC3 may need a first amount of power, a rate of 19.2 kbs using RC4 may need a second amount of power, and a rate of 38.4 kbs using RC3 may need a third amount of power. The calculations may go up to the maximum data rate specified by the profile of that particular user/terminal. For instance, a particular user may have a more expensive billing plan that permits a rate of up to 307.2 kbs, whereas another user may have a cheaper plan that caps the rate at 153.6 kbs.

In step 212, the BSC 68 sends the table to the BTS 66a. In an alternative embodiment, the BTS(s) may compute the required SCH power for each data rate and protocol type based on the power of the FCH currently in use. Accordingly, a table may not be sent by the BSC to the BTS(s). In step 214, using a skewing factor $H_{DSCH}$, the BTS 66a obtains a new code usage level and a new power usage level to determine whether to select RC3 or RC4 as the preferred protocol as previously described. This determination may occur, for example, to update the preferred protocol based on changes in the code and power usage levels originally obtained in step 194 due in part to a finite time lapse between these events. Following the selection of the preferred protocol in either step 216 or 218 (as determined in step 214), the BTS 66a sets the transfer rate at the highest available rate as determined by the preferred protocol in step 220. Again, if the SCH session is to be initiated in a SCH handoff region (which may be different than the FCH handoff region), the discussion referenced with respect to FIG. 7 may be applicable. In this case, the most critical BTS in terms of Cu and Pu may be used to determine the transfer rate. Alternatively, the reference BTS may be used.

Referring now specifically to FIG. 9b, the BTS 66a determines in step 222 whether sufficient resources (such as codes and power) exist to establish the SCH. The BTS is able to compute how much power is available to it at a given time, and from the table provided by the BSC in Step 212 or from the computed FCH power, can determine whether it has the power resources to handle a particular SCH data rate and protocol. Similarly, the BTS knows how much code space remains, and can determine what rates under what protocols it can handle. If the resources do exist, the BTS 66a establishes the SCH in step 228. If the resources do not exist, the BTS 66a may alter the protocol selection in step 224 (e.g., if RC3 was selected in step 214, then the BTS 66a may select RC4 in step 224). In step 226, the BTS 66a may determine whether sufficient resources exist to establish the SCH using the protocol selected in step 224. If the resources do exist, the SCH is established by the BTS 66a in step 228. If the resources do not exist, the original protocol (selected in step 214) may be reselected as the current protocol in step 230, and a determination is made as to whether a lower rate may be used in step 232. If no lower rate exists, the method 190 may backoff from attempting to establish the SCH and return to step 210 after a random or finite time to update the table and attempt to re-establish a SCH. If a lower rate does exist, the lower rate is selected in step 236 and the method returns to step 222 to determine whether the resources exist to establish the SCH.

Once the SCH data session concludes and the resources are released, the selection algorithm is again initiated if a new session is initiated. It should be noted that the FCH may be continuously active between multiple SCH data sessions. Accordingly, each time a new session is initiated, the algorithm as described above may be run for the SCH to determine the preferred protocol to use. As an alternative embodiment, if in Step 222 resources do not exceed, then lower rates may be considered with the current protocol rather than switching protocols as discussed in relation to Step 224. If no lower rate calls can be connected with the preferred protocol may the protocol be switched and again starting from the maximum rate requested, determine what rate can be supported with the other protocol.

In yet another embodiment, where multiple simultaneous SCHs are set up to a single user, each SCH set up would go through the procedure outlined in FIGS. 9a and 9b to determine the protocol to be used. Consequently, the FCH and each of the SCHs may be using different protocols.

In yet another embodiment, the network 60 of FIG. 3 may utilize a partition to reserve one portion of the available codes and power for voice communications and another portion for data communications. For example, sixty percent of the available codes and power may be reserved for voice communications and the remaining forty percent may be reserved for data communications. Alternatively, a different percentage may be reserved of codes and power. For example, the available codes may be split with sixty percent reserved for voice and forty percent reserved for data, while the power may be split with fifty percent reserved for both voice and data.

The partition may be a "hard" or a "soft" partition. A hard partition may be set so that once the available reserved resources (e.g., codes or power) for either voice or data are exhausted, the voice or data must wait until some of the reserved resources are released before establishing another session. In contrast, a soft partition may be vary depending on a variety of factors such as the skewing factor $H_v$ or $H_d$.

In still another embodiment, the selection of the preferred protocol as described above may be utilized with traffic allocation and dynamic load balancing as taught in U.S. Pat. No. 6,069,871, filed on Mar. 6, 1998, and also assigned to Nortel Networks Corp., entitled "TRAFFIC ALLOCATION AND DYNAMIC LOAD BALANCING IN A MULTIPLE CARRIER CELLULAR WIRELESS COMMUNICATION SYSTEM" and hereby incorporated by reference as if reproduced in its entirety.

Figure 10:
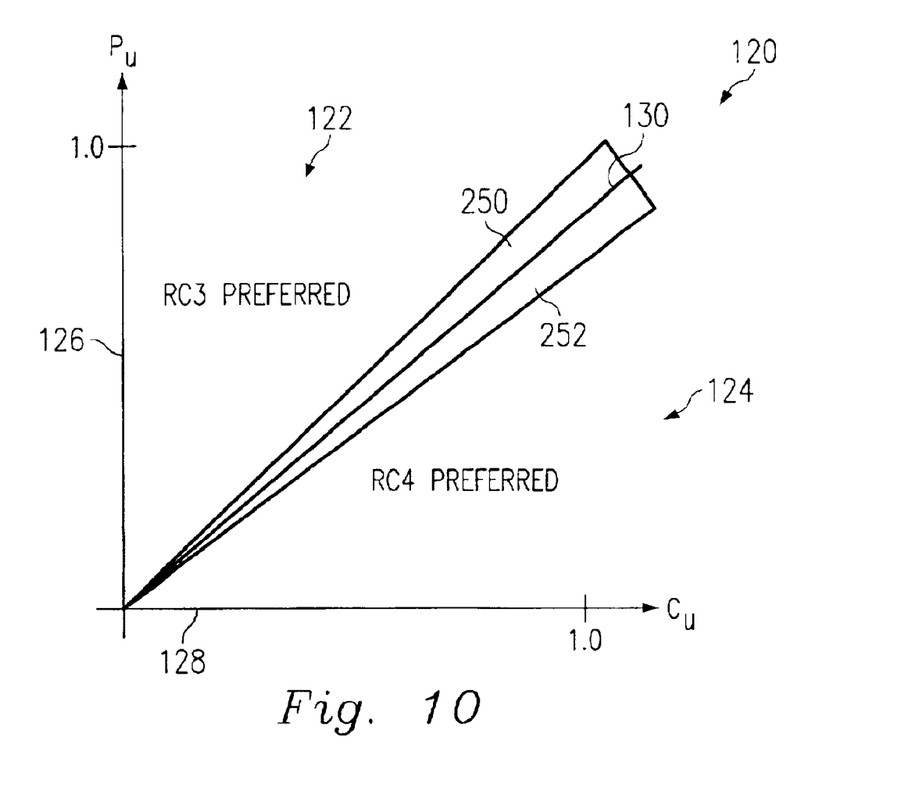
FIG. 10 is a graph illustrating the application of hysteresis to the graph of FIG. 5.

Referring now to FIG. 10, in yet another embodiment, the selection of the preferred protocol as described above with respect to FIG. 6 may occur at times other than call origination. As in FIG. 6, the graph 120 illustrates two zones 122 and 124 referenced against the level of power usage ($P_u$) 126 and the level of code usage ($C_u$) 128, both of which may be normalized. Each zone 122, 124 represents a different distribution of power usage and code usage in the BTS 66a as previously described. The zones 122, 124 are divided by the boundary line 130. Two hysteresis zones 250, 252 represent areas in which a communication session may not be switched from one protocol to the other as described below.

In the present example, a set of triggers may be initiated to force a re-selection procedure during the communication session. For example, a timer may be used such that every thirty seconds into the session, the ETS(s) 66a, 66b of FIG. 3 compute the code usage and power usage to determine if the settings are still optimal for that particular session. If the settings are optimal, nothing further is done for another thirty seconds (or some other random back-off time).

If the settings are no longer optimal and a new protocol is required, a determination is made as to whether the protocol should be changed. This may be accomplished by building hysteresis into the decision process as represented by the zones 150, 152. For example, the communication session is initially established utilizing RC4 as the preferred protocol. Thirty seconds into the call, a check is made as to whether it is still desirable to use RC4 based on the code usage and power usage at the time the check is made. If the RC3 is now the preferred protocol (e.g., the session falls into zone 122 or zone 250), the decision as to whether to change to RC3 depends on whether the session is in zone 122. If the session is in zone 122, then the preferred protocol may be changed to RC3. However, if the session falls within the hysteresis zone 250, the session will continue to use the RC4 protocol. Likewise, an RC3 communication session may be switched to an RC4 communication session if the session falls within zone 124, but not if it is within zone 152.

Such hysteresis may prevent an undesirable number of rapid protocol changes. If the protocol change is determined to be desirable and within predefined limits, the network 60 and the mobile device 72 may change the protocol during the communication session. The procedure to change the session may depend on the underlying technology (e.g., UMTS or IS2000). In some technologies, it may be easier than others. For example, the relevant message structures may be in place in some technologies, while other technologies may need a hard handoff to change the session. In still other technologies, the protocol change may not be possible unless the call is dropped first (which operators may not favor). It is noted that monitoring the communication session (e.g., the reselection option) may not be based on time, but may be based on the data rate of the session, the proximity of the BTSs to a blocking threshold, etc., or a combination of such triggers.

While the above description provides examples that specifically deal with the downlink or forward link (e.g., the BTS to the mobile device), the principles outlined are not constrained to only the downlink or forward link. In general, the principles may also be applied to the uplink or reverse link (e.g., the mobile device to the BTS). For example, in Synchronous CDMA (S-CDMA), the users in the sector on the reverse link may be timed such that their transmissions reach the BTS at the same time. This allows the use of orthogonal codes to maintain the orthogonality of reverse link signals, which increases reverse link capacity and coverage. Accordingly, there may be various protocols that may use different orthogonal code lengths and power usage levels. Therefore, the basic principles detailed in the above description are equally applicable.

It is noted that the application of such principles may be different from that described previously. Using the above example, the S-CDMA system sector might obtain a code usage measurement on the reverse link based on the protocols used in the reverse link by the current active users in its area. The system and/or sector may construct a power usage metric from measurements at the BTS or poll the active users on the reverse link to send an estimate of their current average power used on the reverse link.

If the power usage is constructed at the BTS, then the rise over thermal noise may be used as an indication of power usage. In general, the reverse link power usage is directly proportional to the rise over thermal noise in the reverse link. Protocols that are power efficient will require a lower Eb/No (Energy per bit to noise power spectral density) than protocols that are less power efficient for the same grade of service. Protocols requiring a lower Eb/No may transmit less power and result in a lower noise rise over the thermal noise floor at the BTS for a given number of users on average. Accordingly, a threshold rise over thermal noise limit may be specified to compare the measured rise over thermal noise currently in the system to obtain an indication of $P_u$ (which is not a direct measurement of power usage, but rather an indirect indication of power usage).

If the active users are polled, each terminal specifies to the network the average power used at that time to the system. Because the upper limit of the terminal power is also known to the system, an indication in the sector can be obtained as to the average user $P_u$ of that user, which may be the average terminal power divided by the upper limit of terminal power. Therefore, as each user in the system reports their individual $P_u$, the system can construct a reverse link $P_u$ measure, which can simply be the average of all the reported $P_u$'s from each active user. Consequently, when a new terminal requests a session, the system can specify what protocol to use on the reverse link or uplink.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, and/or the mobile device may not exist in the same fashion in other technologies or implementations, but the same functionality may be achieved using other components. In addition, other methods of obtaining or calculating factors such as the code usage level or the power usage level may be utilized in developing a desired solution. Therefore, the claims should be interpreted in a broad manner, consistent with the present disclosure.

What is claimed is:

1. A method for maximizing a number of communication sessions in a telecommunications system constrained by a maximum number of user codes and a maximum amount of power, the telecommunications system operable to utilize one of a plurality of protocols to establish a communication session, the plurality of protocols including a first protocol more efficient in power use than code use and a second protocol more efficient in code use than power use, the method comprising:

obtaining a first metric, the first metric associated with a percentage of the maximum number of user codes being used by the telecommunications system;

obtaining a second metric, the second metric associated with a percentage of the maximum amount of power being used by the telecommunications system;

comparing the first metric and the second metric, the comparison identifying whether the first metric is greater or whether the second metric is greater; and selecting the second protocol to establish a new communication session if the first metric is greater and selecting the first protocol to establish the new communication session if the second metric is greater.

2. The method of claim 1 further comprising:

comparing the first metric to a predetermined code blocking threshold, the code blocking threshold defining a percentage of the maximum number of codes available for new communication sessions;

comparing the second metric to a predetermined power blocking threshold, the power blocking threshold defining a percentage of the maximum amount of power available in the telecommunications system; and blocking the establishment of the new communication session if either the first metric exceeds the code blocking threshold or the second metric exceeds the power blocking threshold.

3. The method of claim 2 further comprising:

determining if the new communication session is a data transfer communication or a voice communication; and queuing the establishment of the new communication session rather than blocking the establishment of the new communication session if the new communication session is a data transfer communication.

4. The method of claim 2 wherein the first metric and the second metric are normalized.

5. The method of claim 1 further comprising utilizing a skewing factor in determining whether the first metric or the second metric is greater, the skewing factor operable to bias the comparison towards the first metric or the second metric.

6. The method of claim 1 further comprising informing a device which initiated the request of the selected protocol.

7. The method of claim 1 further comprising:

monitoring the first metric and the second metric during the new communication session; and modifying the new communication session to utilize the non-selected protocol if the comparison between the first metric and the second metric indicates that the non-selected protocol should be selected.

8. The method of claim 7 further comprising:

calculating the proximity of the first metric and the second metric to a protocol threshold, the protocol threshold operable to define the first metric and the second metric for each protocol; and modifying the communication session to utilize the non-selected protocol if the calculation indicates that the first metric and the second metric are a predefined minimum distance from the protocol threshold.

9. The method of claim 1 further comprising:

obtaining a plurality of first metrics and second metrics, each of the plurality of first metrics and second metrics associated with a component of the telecommunications system;

comparing the first metrics and the second metrics to find a maximum usage level, wherein the maximum usage level is either a first metric or a second metric; and instructing the component associated with the maximum usage level to select either the first protocol or the second protocol, the selection based on the first metric and the second metric associated with the component.

10. The method of claim 1 further comprising:

selecting a first rate for the new communication session;

determining whether the first rate supports the selected protocol; and establishing the new communication session using the first rate and the selected protocol if the first rate supports the selected protocol.

11. The method of claim 10 further comprising:

selecting a second rate if the first rate does not support the selected protocol;

determining whether the second rate supports the selected protocol; and establishing the new communication session using the second rate and the selected protocol if the second rate supports the selected protocol.

12. The method of claim 10 further comprising:

selecting the non-selected protocol if the first rate does not support the selected protocol;

determining whether the first rate supports the selected protocol; and establishing the new communication session using the first rate and the selected protocol if the first rate supports the selected protocol.

13. The method of claim 1 further comprising:

determining a maximum rate for the new communication session;

determining whether the first and second protocols are available at the maximum rate; and if the first and second protocols are available, selecting the second protocol to establish the new communication session if the first metric is greater and selecting the first protocol to establish the new communication session if the second metric is greater.

14. The method of claim 13 further comprising:

analyzing the availability of at least one resource of the telecommunications system to determine whether a first communication channel can be established using the selected protocol; and establishing the first communication channel if the resource is available.

15. The method of claim 14 further comprising:

selecting the non-selected protocol if the resource is not available;

analyzing the availability of the resource to determine whether the first communication channel can be established using the selected protocol; and blocking the establishment of the new communication session if the first communication channel cannot be established.

16. The method of claim 14 further comprising:

updating the first metric and the second metric;

determining whether to use the first or the second protocol based on the updated first metric and the updated second metric;

analyzing the availability of the resource to determine whether a second communication channel can be established using the selected protocol; and establishing the second communication channel if the resource is available.

17. The method of claim 16 further comprising:

selecting the non-selected protocol if the resource is not available;

analyzing the availability of the resource to determine whether the second communication channel can be established using the selected protocol;

determining whether a lower rate exists if the resource is not available; and selecting the lower rate if the lower rate exists.

18. A method for maximizing the capacity of a telecommunications system constrained by a maximum number of codes and a maximum amount of power, the telecommunications system operable to utilize one of a plurality of protocols to establish a communication session, the plurality of protocols including at least a first protocol more efficient in power use than code use and a second protocol more efficient in code use than power use, the method comprising:

obtaining a code usage level and a power usage level, the code and power usage levels identifying a level of demand on the maximum number of codes and the maximum amount of power being used by the telecommunications system, respectively;

comparing the code usage level and the power usage level, the comparison identifying whether the code usage level is greater or whether the power usage level is greater; and selecting the second protocol to establish a new communication session if the code usage level is greater and selecting the first protocol to establish the new communication session if the power usage level is greater.

19. The method of claim 18 further comprising:

determining if the new communication session is a data transfer communication or a voice communication; and queuing the establishment of the new communication session rather than blocking the establishment of the new communication session if the new communication session is a data transfer communication.

20. The method of claim 18 further comprising utilizing a skewing factor in determining whether the code usage level or the power usage level is greater, the skewing factor operable to bias the comparison towards the code usage level or the power usage level.

21. The method of claim 18 further comprising:

monitoring the code usage level and the power usage level during the new communication session; and modifying the new communication session to utilize the non-selected protocol if the comparison between the code usage level and the power usage level indicates that the non-selected protocol should be selected.

22. The method of claim 18 further comprising:

calculating the proximity of the code usage level and the power usage level to a protocol threshold, the protocol threshold operable to define the code usage level and the power usage level for each protocol; and modifying the communication session to utilize the non-selected protocol if the calculation indicates that the code usage level and the power usage level are a predefined minimum distance from the protocol threshold.

23. A system for maximizing communication session capacity in a first sector of a telecommunications network, wherein the session capacity in the first sector is constrained by a maximum number of user codes and a maximum amount of power, the system comprising:

a first processing center accessible by the first sector, the first processing center operable to communicate with a communication device;

a first protocol more efficient in power use than code use, the first protocol operable to establish the communication session between the first processing center and the communication device;

a second protocol more efficient in code use than power use, the second protocol operable to establish the communication session between the first processing center and the communication device; and an instruction set for use by the first processing center, the instruction set including instructions for:

calculating a first code usage level, the first code usage level associated with a percentage of the maximum number of codes in use by the first processing center;

calculating a first power usage level, the first power usage level associated with a percentage of the maximum amount of power in use by the first processing center;

comparing the first code usage level and the first power usage level, the comparison identifying whether the first code usage level is greater or whether the first power usage level is greater; and selecting the second protocol to establish a communication session if the first code usage level is greater and selecting the first protocol to establish the communication session if the first power usage level is greater.

24. The system of claim 23 wherein the first processing center is distributed between a controller and a transceiver.

25. The system of claim 23 wherein the instruction set further includes instructions for:

obtaining a second code usage level and a second power usage level associated with a second processing center;

comparing the first and second code usage levels and the first and second power usage levels to find a maximum usage level, wherein the maximum usage level is either a code usage level or a power usage level; and instructing the first or second processing center associated with the maximum usage level to select either the first protocol or the second protocol.

26. The system of claim 23 wherein the instruction set further includes instructions for:

determining if the communication session is a data transfer communication or a voice communication; and queuing the establishment of the communication session if the communication session is a data transfer communication.

27. The system of claim 23 wherein the instruction set further includes instructions for utilizing a skewing factor in determining whether the first code usage level or the first power usage level is greater, the skewing factor operable to bias the comparison towards the first code usage level or the first power usage level.

28. The system of claim 23 wherein the instruction set further includes instructions for informing the communication device which initiated the request of the selected protocol.

29. The system of claim 23 wherein the instruction set further includes instructions for:

monitoring the first code usage level and the first power usage level during the communication session; and modifying the communication session to utilize the non-selected protocol if the comparison between the first code usage level and the first power usage level indicates that the non-selected protocol should be selected.

30. The system of claim 23 wherein the instruction set further includes instructions for:

calculating the proximity of the first code usage level and the first power usage level to a protocol threshold, the protocol threshold operable to define the first code usage level and the first power usage level for each of the first and second protocols; and modifying the communication session to utilize the non-selected protocol if the calculation indicates that the first code usage level and the first power usage level are a predefined minimum distance from the protocol threshold.

* * * * *